United States Patent
Haussecker et al.

(10) Patent No.: US 6,462,450 B1
(45) Date of Patent: Oct. 8, 2002

(54) POLE WHEEL COMPRISING A HOLLOW MAGNET BODY AND A RETAINING PART

(75) Inventors: Walter Haussecker, Buehlertal (DE); Mathis Raecke, Karlsruhe (DE); Friedrich-Wilhelm Dreier, Sinzheim (DE); Rainer Kurzmann, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,343

(22) PCT Filed: Jul. 6, 1999

(86) PCT No.: PCT/DE99/02090

§ 371 (c)(1),
(2), (4) Date: Jul. 25, 2000

(87) PCT Pub. No.: WO00/22442

PCT Pub. Date: Apr. 20, 2000

(30) Foreign Application Priority Data

Oct. 12, 1998 (DE) .......................................... 198 46 918

(51) Int. Cl.$^7$ .............................. H02K 21/12; H01F 7/02
(52) U.S. Cl. .............................. 310/156.09; 310/156.38; 310/156.21; 335/302
(58) Field of Search ............................ 310/261, 156.08, 310/156.09, 156.11, 156.14, 156.29, 43; 335/302–306

(56) References Cited

U.S. PATENT DOCUMENTS

| | | | | |
|---|---|---|---|---|
| 2,488,729 A | * | 11/1949 | Kooyman | 310/156 |
| 3,953,752 A | * | 4/1976 | Bannon | 310/156 |
| 4,206,379 A | * | 6/1980 | Onda | 310/156 |
| 4,321,495 A | * | 3/1982 | Kennedy | 310/156 |
| 4,804,872 A | * | 2/1989 | Nakamura et al. | 310/42 |
| 4,888,507 A | * | 12/1989 | Plancon et al. | 310/40 MM |
| 5,298,826 A | * | 3/1994 | Lee et al. | 310/156 |
| 5,500,994 A | * | 3/1996 | Itaya | 29/598 |
| 6,198,372 B1 | * | 3/2001 | Schwarz | 335/302 |

* cited by examiner

*Primary Examiner*—Tran Nguyen
(74) *Attorney, Agent, or Firm*—Ronald E. Greigg

(57) ABSTRACT

A pole wheel of the type driven in rotation by a shaft employs a sensor system disposed on the pole wheel for detecting rotations of the shaft. The pole wheel includes a first component in the form of a hollow magnet body and a second component that is disposed as a retaining part for the first component and is seated firmly on the shaft and is embodied integrally, for the sake of streamlined connection to the first component, with connecting means. Recesses, which for instance can be embodied in groovelike fashion, may be disposed on the second component, that is, the retaining part seated solidly on the shaft, and the first component is injected molded onto the second component, creating positive engagement connecting means comprising the material of the magnet body.

8 Claims, 1 Drawing Sheet

POLE WHEEL COMPRISING A HOLLOW MAGNET BODY AND A RETAINING PART

BACKGROUND OF THE INVENTION

1. Field of the Invention

The invention relates to pole wheels and more particularly to an improved pole wheel having a hollow magnet body and a retaining part;

2. Description of the Prior Art

European Patent Disclosure EP 0 601 228 B1, a pole wheel, a first component that is produced in the form of a hollow magnet body of magnetic powder with thermoplastic binder, has at least one north pole and one south pole in the circumferential direction, and surrounds a shaft in a manner free of tensile and compressive stress, and a second component, which is a retaining part of thermoplastic material seated solidly on the shaft and axially adjoins the first component, and positive engagement connecting means for retaining the hollow magnet body axially and in a manner secure against relative rotation on the retaining part; the positive engagement connecting means being embodied integrally with one of the two components. The retaining part is the component that is embodied integrally with the positively acting connecting means; the connecting means are embodied on the order of spring tongues and each has a hooklike end. In practice, two such connecting means are disposed diametrically opposite one another. The hollow magnet body has an inner diameter such that it surrounds the shaft and is free of tensile stresses and compressive stresses. This is achieved by using a clearance fit or so-called sliding fit. Beginning at the inside diameter, the hollow magnet body has two longitudinal grooves, through which the hooklike ends of the connecting means are moved when the two components are put together, after which the hooklike ends grip on the face end next to the hollow magnet body, while the other zones of the connecting means rest, yielding radially outward, in the grooves. In this way, a bidirectional axial securing to the retaining part as well as securing against relative rotation relative to the retaining part are attained. It can be seen that to pass the hooklike ends through the grooves and to introduce the connecting means into the grooves, a rotational alignment that must be performed by hand or in some other way is required.

From later-published German Patent Disclosure DE 198 23 648 A1, a hollow magnet body acting as a pole wheel is known which is embodied in slit form in the region of one end and which around the slit end has an annular auxiliary body, which acts like a bandage and for that purpose is of metal. This annular auxiliary body takes on the task of pressing the slit end against a shaft. Next to the slit end, the hollow magnet body surrounds the shaft with radial play. There, along the radial play, the hollow magnet body in the state of repose is free of compressive and tensile stresses, so that only stresses caused by centrifugal force act on the material comprising the hollow magnet body.

ADVANTAGES OF THE INVENTION

The characteristics of the invention have the summary that in a simple way, an injection molding operation that is required anyway for the hollow magnet body inside an injection mold simultaneously brings about the positive engagement union with the already-produced retaining part that has been introduced into the injection mold. As a result, the magnet body rests over a large area and without play on the retaining part. The retaining part forms a kind of hub for the hollow magnet body. Injection molding the hollow magnet body onto the retaining part makes it unnecessary to embody the connecting means in the form of resilient tongues and in this way simplifies the choice of material from which the retaining part is made.

In accordance with one embodiment the connecting means generated by injection molding are partly visible and can be monitored by visual checking as to whether an adequate positive engagement between the connecting means and the retaining part has been attained by means of the injection molding operation.

It is possible to produce injection mold cores for the injection tool intended to produce the retaining part with recourse to manufacturing devices and manufacturing means for conventionally embodied mold drafts. This makes it possible to produce the injection mold for the retaining part economically. Improved positive engagement may be obtained by means of additional mold drafts.

In one embodiment of the finished in the finished combination of the retaining body with the hollow magnet body, a bleb remains, which can be broken off in a reliable way inside the outer contour of the pole wheel, so that no problematic protrusion past the pole wheel will thus exist.

A balanced pole wheel maybe created using two injection nozzles for the material of the magnet body; the collar with its two alignment faces is the aid with which the indentations can be made in the retaining part in the alignments relative to the injection nozzles. The collar with the two parallel alignment faces, which can be used in the manner of tool faces of screws, also attains the further advantage, however, of an additional rotational slaving when the magnet body is driven by means of the retaining part. The collar has still another advantage, that it reinforces the radial securing of the hollow magnet body relative to the retaining part that is effected by means of the connecting means that are put in place by positive engagement.

DESCRIPTION OF THE DRAWING

The foregoing and other features and advantages will be apparent from the detailed description contained herein below, taken in conjunction with the drawing, in which.

DESCRIPTION OF THE EXEMPLARY EMBODIMENT

Figure 1:
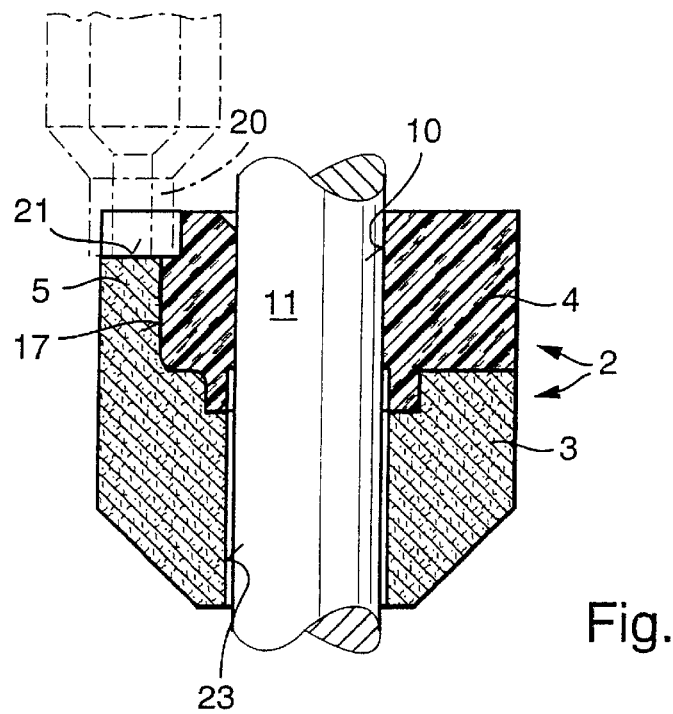
FIG. 1 shows the pole wheel of the invention in longitudinal section, in combination with a shaft.

The pole wheel 2 of the invention shown in FIG. 1 comprises a first component 3, a second component 4, and for instance two connecting means 5. The first component 3 is a hollow magnet body, which is injection-molded integrally with the connecting means 5 from a material such as permanent magnetic powder with thermoplastic binder and is thus united with the second component 4.

Figure 2:
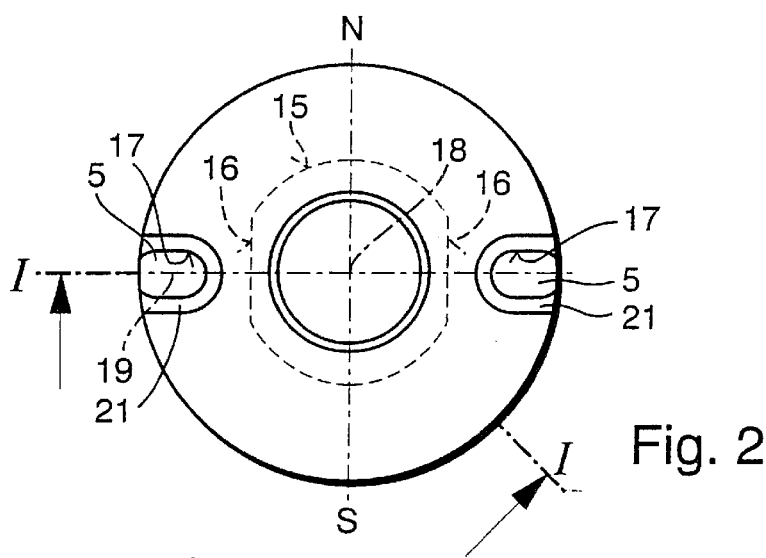
FIG. 2 is an end view of the pole wheel of the invention shown in FIG. 1.
Figure 3:
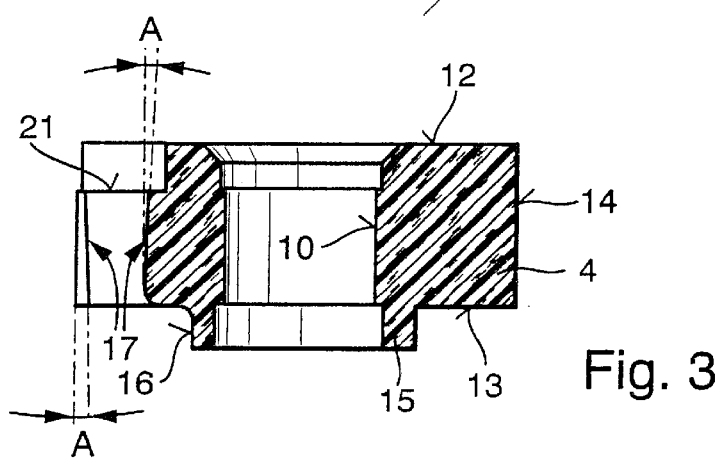
FIG. 3 is a longitudinal section through a component of the pole wheel of the invention.

To that end, the second component is a retaining part 4 used like a kind of hub, which is shown individual in longitudinal section in FIG. 3. This retaining part 4 is embodied symmetrically around a receiving opening 10. The receiving opening 10 is embodied such that together with a shaft 11, shown in FIG. 1, it forms a press fit, so that the complete pole wheel 2 of the invention is seated sufficiently firmly during operation, both in the axial direction relative to the shaft 11 and in the circumferential direction in the event of rotational accelerations and decelerations, including shaking. The retaining part 4 has a first face end 12 and a second face end 13, and between the two face ends 12 and 13, it is embodied with a circumferential face 14 that for instance extends cylindrically. In the exemplary embodiment, a collar 15 extends axially from a reference plane of the second face end 13; this collar has two parallel faces 16 mounted symmetrically to the longitudinal axis of the retaining part 4. One of these faces 16 can be seen in FIG. 3. The association of the two faces 16 to one another and to the collar 15 can be seen best in FIG. 2. The two faces 16 serve the purpose of a rotational alignment, to be described later, of the retaining part 4.

In a way that is part of the invention, two recesses 5, for instance, are disposed axially parallel to the receiving opening 10. For instance, these recesses 5 are embodied with groove cross sections that are partly opened toward the outside, which have some similarity to closable armature grooves of electric motors. However, these grooves 5, unlike the usual geometry for armatures, have a first cross section on the second face end 13 and a second cross section, which is larger than the first cross section, in the vicinity of the first face end 12. The two cross sections are for instance at an opening angle to one another that is twice as large as a typical angle of inclination of mold drafts in thermoplastic components. It is also possible to choose a larger opening angle, however. Assuming the usual angles of inclination, the angle of inclination A shown in FIG. 3 at the recess 17 is shown somewhat exaggerated. It can be seen that here the engineer has freedom of design, but on the other hand aspects with a view to inexpensive manufacture can play a role. To arrive at the desired result according to the invention, it is not absolutely necessary to make the recesses 17 in the form of grooves that are at least partly open toward the outside. For instance, it is also possible to dispose openings extending substantially longitudinally through the retaining body 4, and these openings can be embodied in hollow-conical form.

As seen particularly in FIG. 2, the recesses 17 are disposed on a plane of symmetry 19 that passes through a longitudinal axis 18 of the retaining body 4. The faces 16 are oriented perpendicular to this plane of symmetry 19. After the production of the retaining part 4, for instance from polyamide and for instance with the addition of glass fibers, the faces 16 serve the purpose of alignment in an injection mold, not shown, that is intended for the production of the first component 3. Specifically, the faces 16 serve, by means of an insertion and alignment tool, not shown, that engages the faces 16, to put the retaining part 4 in a rotational alignment, in this case with respect to two injection nozzles 20, one of which is shown in dot-dashed lines in FIG. 1 and plunges into an indentation 21 aligned with the recess 17. Once the injection molding tool, not shown, for the magnet body 3 is closed, then by means of the two injection nozzles 20, only one of which is shown on account of the selected sectional course in FIG. 2, the material that forms the magnet body 3 is injected through the recess 17. Naturally in the process this material is also applied directly to the second face end 13, the collar 15 and the two faces 16. In this sense, the injection of material for the magnet body 3 is at the same time a structural unification with the retaining part 4. It can be seen that injection molding of the magnet body 3 leads to a positive engagement and thus play-free unification with the retaining part. This can be exploited so that the magnet body 3 can be provided with an axial opening 23, with a diameter so much greater than a diameter of the shaft 11 that in any case radial play will exist between the shaft 11 and the axial opening 23. This prevents seizing of the magnet body 3 with the shaft 11, and stress on the material comprising the magnet body 3 is limited essentially by unavoidable centrifugal forces upon rotations of the shaft 11.

To enable the magnet body 3 to perform its task as a pole wheel 2, it is magnetized, so that it has at least one north pole N and an associated south pole S, as shown in FIG. 2. By way of example, the north pole and the south pole are provided outside the two connecting means 5 selected here, so that generating these poles by magnetization can be done unimpeded.

The foregoing relates to preferred exemplary embodiments of the invention; it being understood that other variants and embodiments are therefore possible within the spirit and scope of the invention, the latter being defined by the appended claims.

We claim:

1. A pole wheel including a first component that is produced in the form of a hollow magnet body of magnetic powder with thermoplastic binder, the first component having at least one north pole and one south pole in the circumferential direction and surrounding a shaft in a manner free of tensile and compressive stress, and a second component in the form of a retaining part of thermoplastic material seated solidly by press fit on the shaft and axially adjusting the first component, and connecting means for retaining the hollow magnet body axially and in a manner secure against relative rotation on the retaining part, the connecting means being embodied integrally with one of the two components, the improvement wherein the connecting means (5) are embodied integrally with the first component (3), and that the second component (4) has recesses (17) into which the connecting means (5) are formed by injection molding, wherein the second component (4) has a first face end (12) and a second face end (13), with the second face end (13) being positioned adjacent the first component (3), wherein the recesses (17) are in communication with both face ends, and the recesses, where they communicate with the first face end, have a cross section which is larger than their cross section at the second face end.

2. The pole wheel of claim 1, wherein the recesses (17) are embodied as longitudinal grooves that are partly open toward the circumference of the second component (4).

3. The pole wheel of claim 1, wherein the first opening cross sections and the second opening cross sections are positioned and located with respect to each other so that they form an opening angle which enables easy removal of the second component from a mold.

4. The pole wheel of claim 2, wherein the second component (4) has a first face end (12) and a second face end (13), with the second face end (13) being positioned adjacent the first component (3), wherein the recesses (17) are in communication with both face ends, and the recesses, where they communicate with the first face end, have a cross section which is larger than their cross section at the second face end.

5. The pole wheel of claim 2, wherein the second component has indentations (21) into which injection nozzles (20) can be temporarily plunged for injection of material of the magnet body (3), and wherein the indentations (21) are disposed in alignment with the recesses (17).

6. The pole wheel of claim 5, wherein two opposed recesses (17) are disposed in a plane of symmetry (19) that passes through a longitudinal axis (18) of the second component (4), and that the second component (4) is provided with a collar (15), pointing into the hollow magnet body (3), that has two parallel faces (16) that flatten the collar twice, and the alignment faces have a predetermined angular alignment with the plane of symmetry (19).

7. A pole wheel including a first component that is produced in the form of a hollow magnet body of magnetic powder with thermoplastic binder, the first component having at least one north pole and one south pole in the circumferential direction and surrounding a shaft in a manner free of tensile and compressive stress, and a second component in the form of a retaining part of thermoplastic material seated solidly by press fit on the shaft and axially adjusting the first component, and connecting means for retaining the hollow magnet body axially and in a manner secure against relative rotation or the retaining part, the connecting means being embodied integrally with one of the two components, the improvement wherein the connecting means (5) are embodied integrally with the first component (3), and that the second component (4) has recesses (17) into which the connecting means (5) are formed by injection molding, wherein the second component has indentations (21) into which injection nozzles (20) can be temporarily plunged for injection of material of the magnet body (3), and wherein the indentations (21) are disposed in alignment with the recesses (17).

8. The pole wheel of claim 7, wherein two opposed recesses (17) are disposed in a plane of symmetry (19) that passes through a longitudinal axis (18) of the second component (4), and that the second component (4) is provided with a collar (15), pointing into the hollow magnet body (3), that has two parallel faces (16) that flatten the collar twice, and the alignment faces have a predetermined angular alignment with the plane of symmetry (19).

* * * * *